US005521851A

United States Patent [19]

Wei et al.

[11] Patent Number: 5,521,851

[45] Date of Patent: May 28, 1996

[54] NOISE REDUCTION METHOD AND APPARATUS

[75] Inventors: Daming Wei; Eishi Harasawa; Hajime Harada, all of Tokyo, Japan

[73] Assignee: Nihon Kohden Corporation, Tokyo, Japan

[21] Appl. No.: 233,684

[22] Filed: Apr. 26, 1994

[30] Foreign Application Priority Data

Apr. 26, 1993 [JP] Japan .................................. 5-120463

[51] Int. Cl.⁶ .................................................. H04B 15/00

[52] U.S. Cl. .......................... 364/574; 364/572; 364/517; 364/724.01; 364/724.07

[58] Field of Search .............................. 364/574, 724.01, 364/724.07, 724.08, 572, 573, 517; 128/696, 661.04, 733, 901, 902; 370/32.1; 379/406, 410, 36; 330/141, 144, 149, 132; 367/901

[56] References Cited

U.S. PATENT DOCUMENTS

| | | | |
|---|---|---|---|
| 5,029,118 | 7/1991 | Nahajima et al. | 364/572 |
| 5,255,210 | 10/1993 | Garder et al. | 364/572 |

OTHER PUBLICATIONS

Widrow et al. Adaptive Noise Cancelling: Principles and Applicaitons, Dec. 1975, pp. 1692–1716.

*Primary Examiner*—Edward R. Cosimano
*Assistant Examiner*—Hal P. Wachsman
*Attorney, Agent, or Firm*—Hoffmann & Baron

[57] ABSTRACT

A method and apparatus is disclosed to reduce noise which overlaps detected signals in a common frequency band for detection of distributed signals from multiple measurement points. The method decomposes a input signal into a noise-free part called basic signal and a noise-overlapping part called residual signal. Noise contained in residual signal is recognized by comparing it with a comparison signal. The comparison signal corresponding to a measurement point is computed by a linear combination of all other points weighted with parameters which reflect amplitude relationship of distributed signals and are calculated during a learning phase at the beginning of measurement. With residual signal and corresponding comparison signal, a noise index is calculated and then used to extract signal components from the residual signal. The extracted signal components are added to basic signal as the output of the method. The method is effective in reducing signal-overlapping noise with little distortion of signal.

12 Claims, 14 Drawing Sheets

NOISE REDUCTION METHOD AND APPARATUS

BACKGROUND OF THE INVENTION

1. Field of the Invention

The present invention relates to a noise reduction method and apparatus for reducing noise which overlaps detected signals in a common frequency band and is generated from sources different from a signal source during detection of distributed signals generated from the signal source at a plurality of measurement points.

2. Description of the Related Art

An example for such a detection is the Electrocardiogram (ECG), where the heart is the signal source and the distributed signals of body surface potentials generated from the heart are detected with multiple electrocardiographic electrodes mounted on limbs and the chest. A common problem in ECG detection is the muscle noise that arises from the skeletal muscle tremors and makes the detected ECG signals difficult to be analyzed by human or by an automatic analysis program. To remove the muscle noise, a low-pass filter, which generally has a cut-off frequency of 25 Hz, is commonly used at the present time. Since significant energy of muscle noise is typically at the frequency band higher than 25 Hz, this kind of filter can remove the muscle noise in some extents. However, since the spectrum of ECG signal is within the range of 0.05 to 100 Hz, this filter reduces high frequency components of the ECG waveform, causing distortion in ECG waveform, especially in the QRS peak magnitude. This disadvantage is undesirable for diagnosis since the QRS magnitude itself is often taken as a index in ECG analysis.

In recent years, signal-averaging technology is used to remove the muscle noise in ECG detection. Although this method is effective in some cases, it has limitations in application. First, this method is only applicable for periodic signals. Taken ECG as an example, the method can not be applied to ECG waveforms with premature ventricular contract (PVC) or other type of arrhythmias. Secondly, this method can not be implemented in real-time, which is desirable in many cases.

It is the fact that finding a method that can effectively reduce noise, which has a overlapping frequency band with detected signal, with no signal distortion is a difficult problem and therefore is still one of current topics in data processing.

SUMMARY OF THE INVENTION

Accordingly, an object of the present invention is to provide a noise reduction method and apparatus for reducing noise which overlaps detected signals in a common frequency band and are generated from sources different from a signal source during detection of distributed signals generated from the signal source at a plurality of measurement points.

While a traditional filter passes the main frequency components of detected signal and throws away the remainder part which may contain both overlapping noise and signal components, the basic idea of the present invention is to pick up the signal components contained in filter-thrown part and add it back to the filter-passed part so as to achieve high noise rejection as well as low signal distortion, which has been so far difficult with traditional filter technology.

In doing this, the detected signal is first filtered with a low-pass filter to extract a basic signal, which comprises main frequency components of the original signal. The frequency characteristic of the filter is designed to enable the basic signal be free from the overlapping noise. Furthermore, the filter is required to have a zero phase shift for the subsequent processing.

Then, by subtracting the basic signal from the detected signal, a residual signal is obtained, which comprises both overlapping noise and signal components. In residual signal, the noise to signal ratio larger than in the detected signals, that is preferable for a noise recognition algorithm described below.

In order to recognize noise from residual signal, the present invention calculates a comparison signal corresponding to the residual signal. The comparison signal is expected to keep the signal components contained in the residual signal unchanged and to make the noise changed from its original manner. It is clear that this feather of the comparison signal will make it possible to recognize the noise by comparing residual signal with the corresponding comparison signal, seeing from the angle of consistence or, difference between the residual signals and the comparison signal.

To compute comparison signal, spatial information contained in said distributed signals of measurement points is used in the present invention.

This method requires (a) the signal source from which the distributed signals are detected can be approximated by a linear or a non-linear model with respect to the distributed signals, and (b) the number of measurement points (or detecting channels) is sufficient enough to determine the system parameters of the model. For example, if a detecting subject can be modeled with a linear system where the maximum number of linearly independent variables is L, the channel number of measurement N should be N>L for determine L parameters of the model. In fact, most of realistic measurement systems can satisfy these conditions.

In a system satisfying the above conditions, since the number of detecting channels is greater than the number of linearly independent variables, the detected signals from all channels are not linearly independent from each other. Therefore, signal Vi of an arbitrary channel among the N channels can be represented by a linear combination of signals of other channels, weighted by corresponding coefficients, as can be described by $$Vi = \sum_{\substack{j=1 \\ j \neq i}}^{N} \alpha_{ij} V_j \tag{1}$$

where $\alpha_{ij}$ (i=1, . . . N, and j=1, . . . , N) are called system parameters that determine the amplitude relationship among channels.

Generally, system parameters are unknown for a detecting subject before measurement. Therefore a learning phase is necessary before actual measurement to learn the system, namely to solve system parameters. The principle to do this is as follows.

During learning phase, a set of learning data Vi(j) (i=1,2, . . . N; j=1,2, . . . M) are acquired, where i denotes channel and j denotes sampling time. By applying (1), a simultaneous equation is obtained with regard to an arbitrary channel i using the learning data:

$$V_i = V_j \alpha_{ij} \tag{2}$$

where $$V_i = [V_i(1)\ V_i(2) \ldots V_i(M)]^T \quad (2')$$

$$Vj = \begin{bmatrix} V_1(1) & V_2(1) & \ldots & V_N(1) \\ V_1(2) & V_2(2) & \ldots & V_N(2) \\ & \ldots & & \\ V_1(M) & V_2(M) & & V_N(M) \end{bmatrix}$$

$$\alpha_{ij} = [\alpha_{i1}\ \alpha_{i2} \ldots \alpha_{iN}]^T, \quad \alpha_{ii} \equiv 0$$

and $[\ ]^T$ represents matrix transposition.

With equation (2), $\alpha_{ij}$ (i=1,2, . . . N) can be easily solved with least squares method (LSM), which is well known and widely applied to identifying an unknown system. To ensure unique solution for $\alpha_{ij}$, sample data used in (2') should make the matrix's rank equal to or lager than N–1. This can be done by choosing sufficient large M and selecting learning data where signal to noise ratio is sufficiently large.

For a non-linear system, the system parameters can be solved with a proper non-linear least squares method.

Now let us suppose that the detecting subject satisfies condition (a) and (b) and whose system parameters, $\alpha_{ij}$, have been computed during the learning phase. In this condition, a comparison signal corresponding to the residual signal is calculated for each of said measurement points using (1).

Since $\alpha_{ij}$ reflects the amplitude relationship of signals generated from the signal source, the solution of (1) will reproduce the signal components contained in the residual signal. On the other hand, since noise is generated from sources other than said signal source and generally does not obey the same rule that signals obey, noise in the comparison signal will be changed from its original manner by (1). That is to say that the change in comparison signal from corresponding residual signal is due to noise. This feature makes it possible to recognize noise, or extract signal components from the residual signal by comparing the comparison signal with corresponding residual signal. Furthermore, since the noise to signal ratio is amplified in the residual signal as described above, it is possible to find an index sensitively reflecting the difference between comparison signal and corresponding residual signal.

There are several ways to define and to calculate noise index. One of the realistic ways is to define noise index as the coherence of residual signal and corresponding comparison signal. In this way, noise index takes value of 1, if the comparison signal exactly matches the residual signal, meaning that no noise is contained in the detected signal. The noise index takes values between 0 to 1. The more the comparison signal is apart from the residual signal, the close the noise index to zero.

In a simple way, the above noise index can be considered as an approximation of the proportion of signal components in residual signal. In this approximation, the signal components contained in residual signal is extracted by multiplying residual signal by the noise index. More precisely, the residual signal is multiplied by a function of noise index to extract the signal components. The function reflects statistical relationship between the noise index and the noise level contained in residual signal and therefore can realize a higher noise rejection, as is described in following sections.

As finally step, the extracted signal components is added to said basic signal as the output of the method or apparatus.

Experiments have been made to prove that the present invention is very effective in reducing noise which overlaps detected signals in a common frequency band and generated from sources different from the signal source during detection of distributed signals generated from a common signal source at a plurality of measurement points with little distortion of original signals. For example, when the present invention is applied to detecting body surface electrocardiogram, noise such as muscle artifact, random interference, power interference are effectively reduced with little distortion of ECG signal. Further, the present invention is effective even in cases when ECG signals contain premature ventricular contraction (PVC), ventricular fibrillation or other types of cardiac arrhythmias.

The above and further objects, aspects and novel feathers of the invention will become more apparent through the following detailed description, read in connection with the accompanying drawings. It is worth mentioning, however, that the drawings are for the purpose of illustration only and are not intended to limit the invention.

DETAILED DESCRIPTION OF THE PREFERRED EMBODIMENTS

Figure 1:
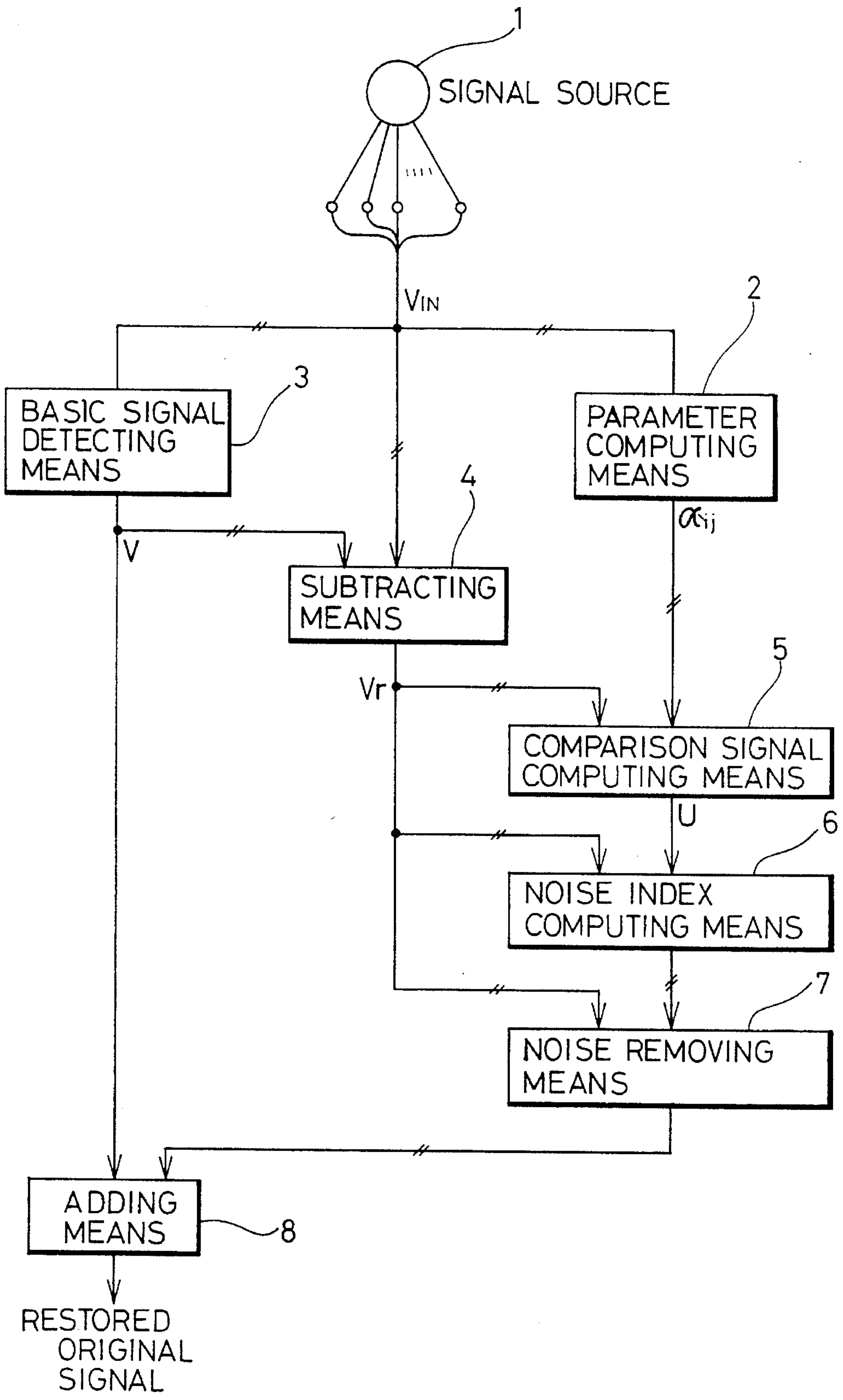
FIG. 1 is a functional block diagram illustrating the basic construction of an electrocardiograph to which the present invention is applied.

FIG. 1 shows, in functional block diagram, the basic construction of an 8-channel electrocardiograph to which the present invention is applied.

Referring to In FIG. 1, the signal source 1 is the heart. Electrocardiographic signals distributed on the body surface, the original signals, are detected from right arm (RA), left arm (LA) and six positions C1 through C6 on the chest.

Parameter computing means 2 calculates system parameters with M samples of detected signals of all channels, where M+1 should be equal to or larger than N, the number of channel. System parameters are a set of coefficients weighted with which a detected signal of arbitrary channel, $V_{in}^{i}$ (i=1, 2, . . . , N), can expressed as a linear combination of detected signals of remainder channels, $V_{in}^{j}$ (j=1, 2, . . . , N; j≠i).

Mathematical models of the heart have been studied for a long history and it has already become known that a linear model of heart with seven maximum number of independent parameters can predict electrocardiogram in a very high precision.

Figure 2:
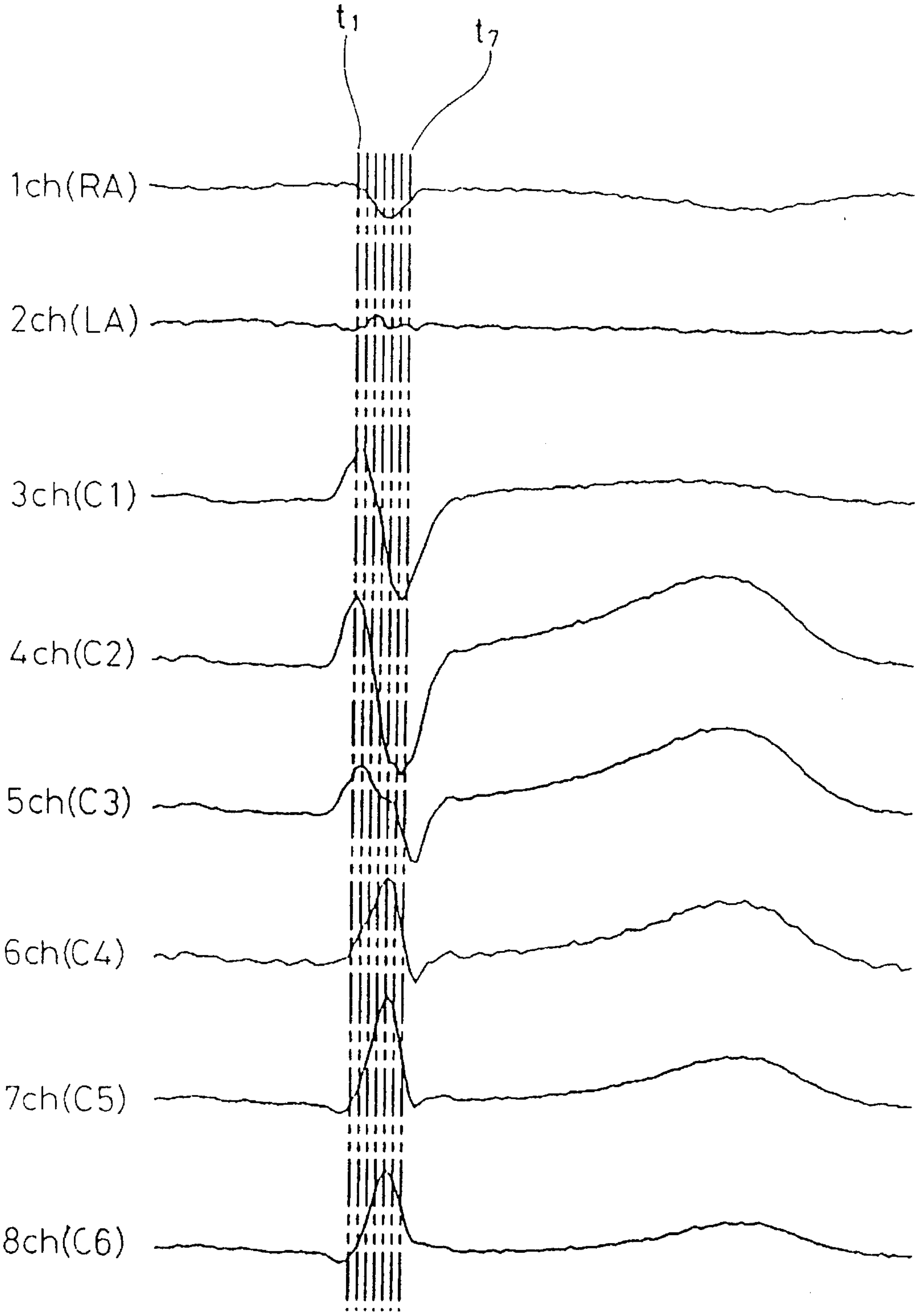
FIG. 2 is a diagram showing detected ECG waveforms from all leads of the electrocardiograph, which are used in calculating system parameters during learning phase.

For example, if seven (or more than seven) samples of all channels are detected at sampling time t1 through t7, as shown in FIG. 2, during a learning phase, and if the signal to noise ratio of these samples is sufficiently large, a simultaneous equation associated with $\alpha_{ij}$ (i=1,2, . . . N; j=1, 2, . . . , N; ) as described by formula (2) are established. Solution for $\alpha_{ij}$ (i=1,2, . . . N; j=1, 2, . . . , N; ) is solved with least squares method, based on assumption that the electrocardiographic system of human heart is approximated with a linear system containing seven maximum independent variables.

The system parameters are calculated beforehand are stored in the computer for later use.

Referring to FIG. 1 again, basic signal detecting means 3 detects basic signal V from detected signal $V_{in}$ for each of the eight channels, the main energy of which is at frequency band from 0.05 Hz to 100 Hz. Basic signal detecting means is formed by a zero-phase low-pass filter with a cut-off frequency of, for example, 12 Hz, to make the basic signal free from noise. Then subtracting means 4 subtracts basic signal V from the detected signal $V_{in}$ to generate a residual signal $V_r$.

Corresponding to residual signal $V_r$ of each of the eight channels, comparison signal computing means 5 calculates a comparison signal with residual signals of remainder seven channels and with corresponding system parameters. For example, corresponding to $V_{r1}$ of channel 1, a comparison signal $U_1$ is calculated with residual signals $V_{r2}$ through $V_{r8}$ by $$U_1=\alpha_{12}V_{r2}+\alpha_{13}V_{r3}+\ldots+\alpha_{18}V_{r8} \quad (3)$$

For other channels, comparison signals $U_2$ through $U_8$ are calculated in the similar way.

By comparing residual signal $V_r$ and corresponding comparison signal U of each channel, a noise index is computed by noise index computing means 6 to measure noise level in the channel. An example of noise index is defined as the coherence of the residual signal and corresponding comparison signal calculated by $$c=\frac{2V_r(n)U(n)}{V_r^2(n)+U^2(n)} \quad (4)$$

Coherence c is used in physics to reflect consistency of two signals. In our case, if no noise is contained in residual signal, comparison signal U resulted from (1) will reproduce residual signal $V_r$, and therefore c will equal to 1. On the other hand, the more U is different from Vr, the more noise is contained in $U_r$ and therefore c is close to zero. It is clear that c varies between 0 to 1.

Noise removing means 7 removes noise contained in residual signal $V_r$ according to the noise index value at the time to extract signal components from $V_r$. One way in doing this, for example, is to multiply residual signals of V by corresponding values of c.

The extracted signal components of each channel is added to corresponding basic signal by adding means 8 to restore the original signal which has less noise than the detected signal. The restored signals are available for further use, for example, to derive 12-lead ECG waveforms and to send them to a display device.

At the learning phase of measurement, the R wave of each channel is detected and basic line wander, if any, is corrected. Then system parameters are calculate beforehand using samples of t1 through t7 as showed in FIG. 2. Table 1 is an example of calculated system parameters $\alpha_{ij}$ (i=1,2, . . . 8; j=1, 2, . . . , 8) from actually detected ECG waveforms.

TABLE 1

| | j | | | | | | | |
|---|---|---|---|---|---|---|---|---|
| i | ch1 | ch2 | ch3 | ch4 | ch5 | ch6 | ch7 | ch8 |
| ch1 | 0.0000 | −0.3580 | −0.2487 | 0.3896 | −0.6266 | 0.6514 | −0.4785 | −0.2130 |
| ch2 | −1.6784 | 0.0000 | −0.4746 | 0.4614 | −0.3959 | −0.4554 | 1.2954 | −0.2130 |
| ch3 | −1.7456 | −0.7104 | 0.0000 | 1.3228 | −0.8041 | −1.2368 | 1.8586 | −1.0186 |
| ch4 | 1.1733 | 0.2964 | 0.5676 | 0.0000 | 1.1158 | −0.6221 | 0.5920 | −0.4119 |
| ch5 | −0.7566 | −0.1018 | −0.1383 | 0.4474 | 0.0000 | 1.6687 | −1.8357 | 0.7614 |
| ch6 | 0.1717 | −0.0256 | −0.0465 | −0.0545 | 0.3644 | 0.0000 | 1.2261 | −0.5834 |
| ch7 | −0.0791 | 0.0444 | 0.0438 | 0.0325 | −0.2514 | 0.7690 | 0.0000 | 0.5444 |
| ch8 | −0.0887 | −0.1523 | −0.0605 | −0.0581 | 0.2627 | −0.9220 | 1.3719 | 0.0000 |

Figures 3A, 3B, 3C:
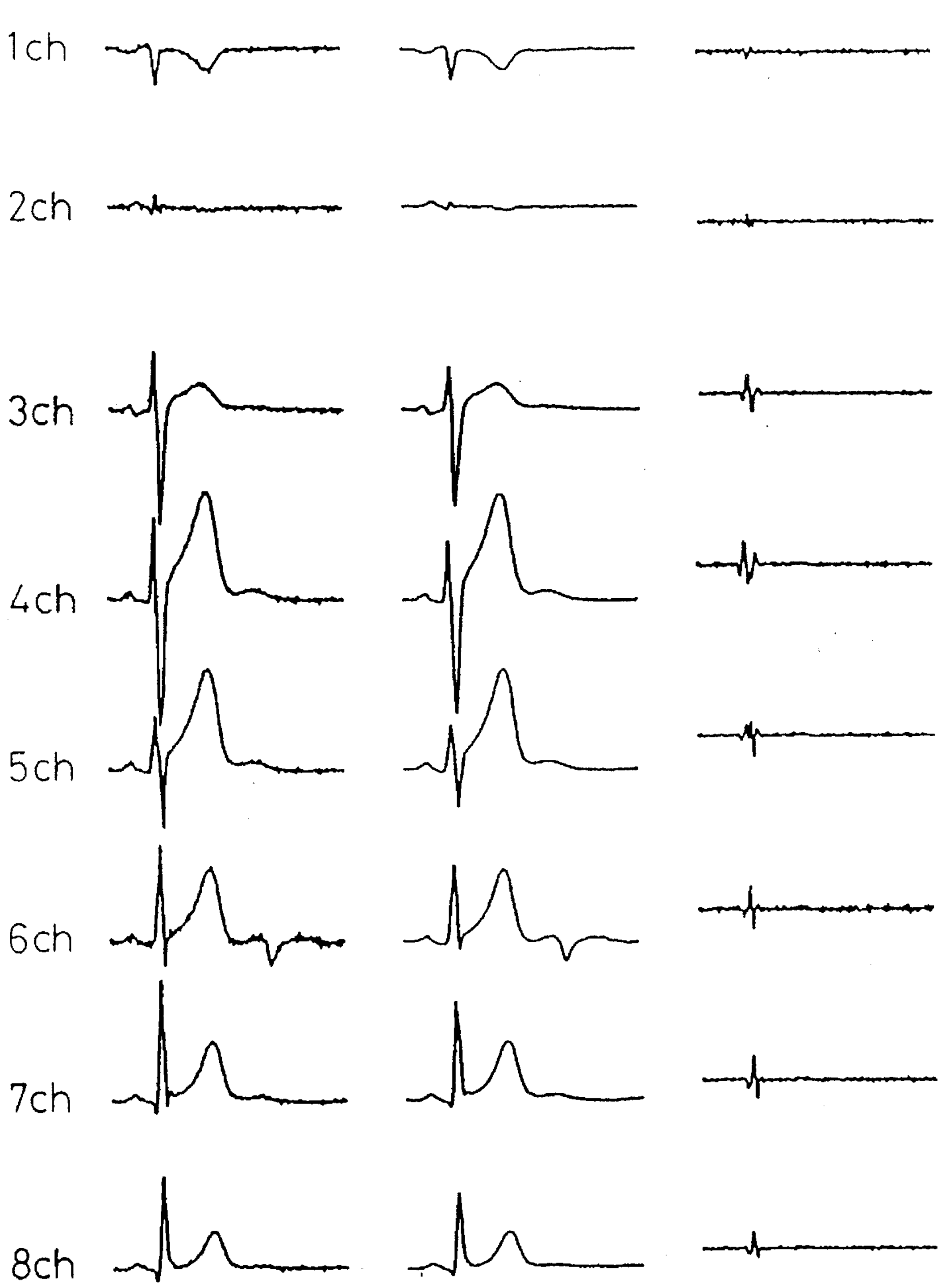
FIG. 3A is a diagram of detected signal $V_{in}$ for each channel.
FIG. 3B is a diagram of detected basic signal V for each channel.
FIG. 3C is a diagram showing a residual signal $V_r$ for each channel.

When measurement starts, the detected signal $V_{in}$ (FIG. 3A) of each channel is input to basic signal means 3 to detect basic signal V (FIG. 3B). Then the subtracting means 4 generates residual signal $V_r$ (FIG. 3C). As seen in FIG. 3C, in residual signal, the noise is relatively amplified with regard to signal components.

Figures 4A, 4B, 4C:
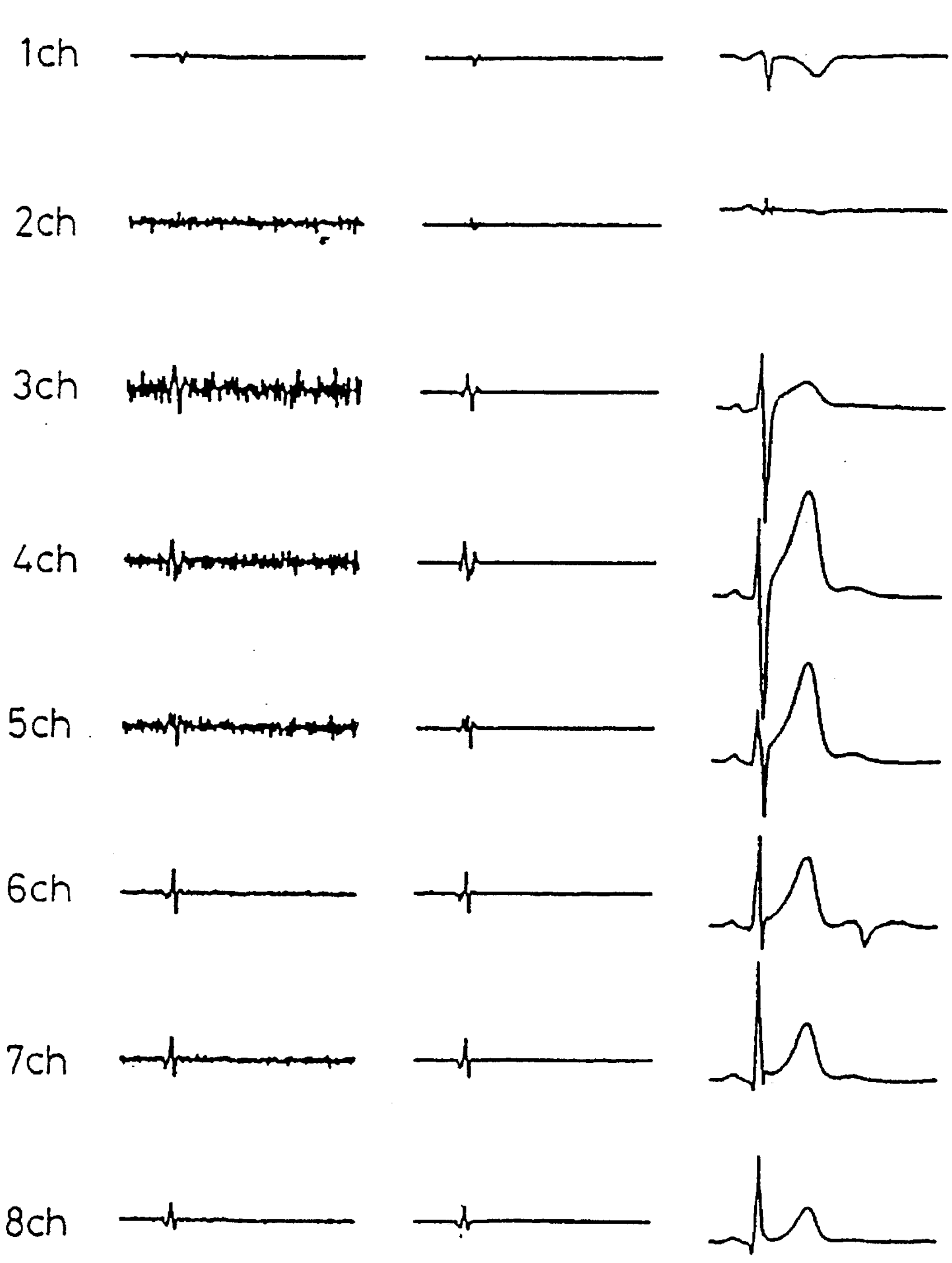
FIG. 4A is a diagram showing a comparison signal for each channel.
FIG. 4B is a diagram showing signal components contained in the residual signal for each channel.
FIG. 4C is a diagram showing an electrocardiograph signal which is the result of adding the residual signal to the basic signal.

Then comparison signal computing means 5 calculates a comparison signal (FIG. 4D) for each channel using Vr of remainder channels and corresponding $\alpha_{ij}$. Since noise contained in Vr is independent of $\alpha_{ij}$, noise of comparison signals on different channels is re-distributed among channels and therefore is changed from noise in residual signal, as can be clearly seen in FIG. 4A.

By calculating noise index with residual signal Vr and corresponding comparison signal U and by multiplying it by Vr, signal components contained in residual signal (FIG. 4B) is detected, which is free from noise. By adding this signal to basic signal, the original electrocardiographic signal (FIG. 4C) is obtained.

The above process of measurement and processing is performed for each channel and carried out in each time sequence.

Now we will give some additional explanation to noise index computing means 6. In (3), noise index c is calculated using values Vr and U of undergoing sampling time. However, noise is of statistic characteristic. Therefore, by taking time-related statistic effect into consideration, noise index c can also be calculated with values of Vr and U within a window, as described by $$\sum_{m=-w}^{w} (V_{ri}^2(n+m) + U_i^2(n+m)) \tag{5}$$

It has been proved by practice that (5) is an improvement of (4) in reducing noise.

Further, due to the fact that noise comparison signal is re-distributed among channels by summation of weighted Vr of different channels, there is another way to calculate c with values of Vr and U of all channels as an average and common measure of noise index for all channels at the sampling time, as described by $$c(n) = \frac{2 \sum_{i=1}^{8} V_{ri}(n) U_i(n)}{\sum_{i=1}^{8} (V_{ri}^2(n) + U_i^2(n))} \tag{6}$$

It has also been proved by practice that (6) is an improvement of (4) in reducing noise.

Furthermore, if both time and spatial effects of noise distribution are considered, c can also be calculated through all channels and over a time window, as described by $$\sum_{m=-w}^{w} \sum_{i=1}^{8} (V_{ri}^2(n+m) + U_i^2(n+m)) \tag{7}$$

It has also been proved by practice that (7) is an improvement of (4) in reducing noise.

Now we will give some additional explanation to noise removing means. In above description, noise removing means removes noise in Vr by multiplying Vr by c of corresponding channel. It is an alternate to remove noise by multiplying Vr by c·f(c), instead of c, where f(c) is defined by $$f(c) = \frac{(1+b)c^2}{b+c^2} \tag{8}$$

Figure 5A:
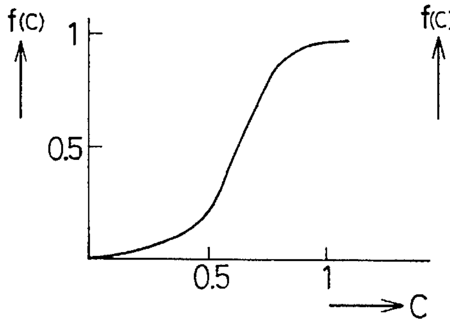
FIG. 5A is a diagram showing a first example of a function of noise index.

Characteristic property of f(c) in relation to c is shown in FIG. 5A (b=1). It has been proved that this improvement can give better effect of noise reduction than above described noise removing means. The reason for this is that although noise index directly reflects noise level in some extent, the relation between noise and noise index is essentially statistic. As can be understood by referencing to FIG. 5A, if c takes high value close to 1—in this case probability of presence of noise is small—Vr will not be reduced so as to avoid signal distortion as less as possible. On the other hand, if c takes a relatively low value—in this case the probability of presence of noise is high—the value of f(c) rapidly reaches to zero to make noise reduction more effective.

Figure 5B:
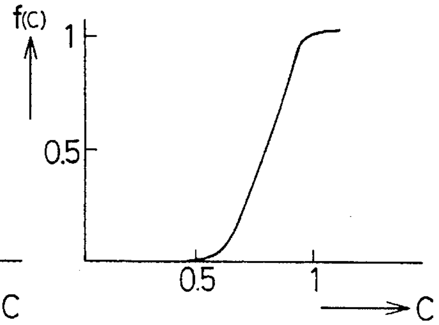
FIG. 5B is a diagram showing a second example of a function of noise index.

For an intermittent signal such as ECG signal, noise index for base line, where no signals are present, can be measured and a function of c:

$$f(c) = \exp\left( - \frac{b^2(1-|c|)^2}{2(1-|c_b|)^2} \right) \tag{9}$$

can be used by noise removing means to improve noise reduction effect, where $c_b$ is the noise index calculated using Vr and U in basic line. For electrocardiographic signal, $c_b$ is measured as an average value of noise index over a period of 40 ms in base line. In implementation, $c_b$ is calculated beforehand together with $\alpha_{ij}$ in the learning phase at the beginning of measurement. FIG. 5B shows the characteristic property of (9) where $c_b$ is set to 0.5 and b is set to 3.

Figure 6:
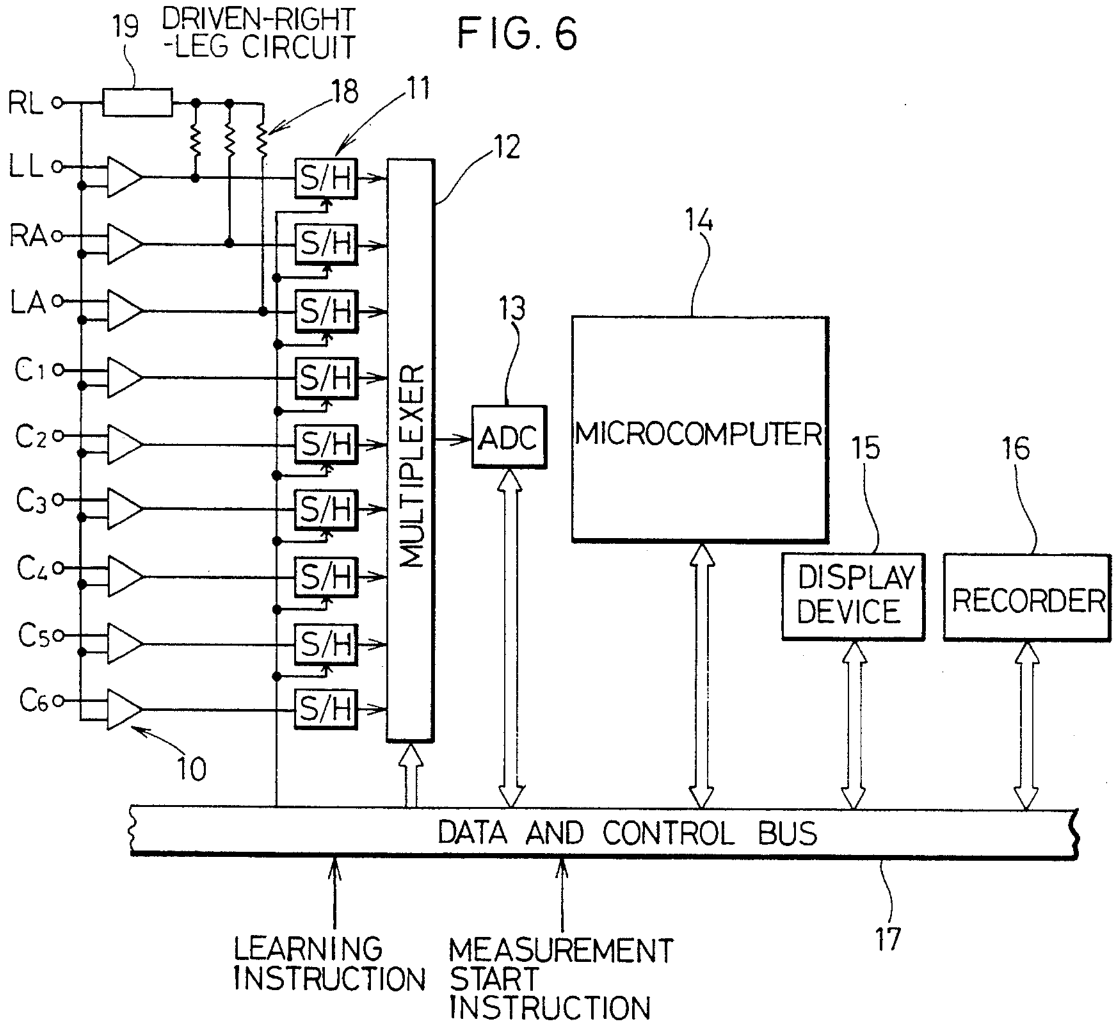
FIG. 6 is an illustration showing the construction of a microcomputer-based electrocardiograph as an example of the invention.

FIG. 6 illustrates a microcomputer-based, conventional 12-lead electrocardiograph to which the present invention is applied. As well known, the electrocardiographic signals are sensed from right arm (RA), left arm (LA), left leg (LL), and six chest positions named V1 through V6. The averaging circuit 18 generates an average potential of RA, LA and LL and passes it to right leg through a so-called driven-right-leg circuit 19. Referring to the output of 19, ECG signals of eight channels RA, LA, and V1 through V6 are amplified by differential amplifier 10 and sampled by sampling-hold circuit 11. Through multiplexer 12 the ECG signals of eight channels are sequentially digitized by the A/D converter 13 and stored in the microcomputer 14. With built-in program based on the principle of the present invention, system parameters are computed and the signals are processed. The resultant eight channels signals are further used to construct standard 12-lead ECG.

The ECG waveforms are displayed in display device 15 and printed in recorder 16 which are connected with microcomputer 14 through data bus and control bus.

Figure 7A:
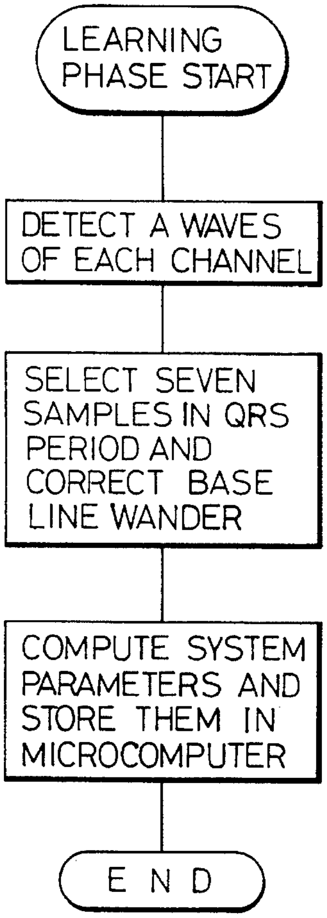
FIG. 7A is a first flowchart illustrating the operation in the computer when applying the invention.
Figure 7B:
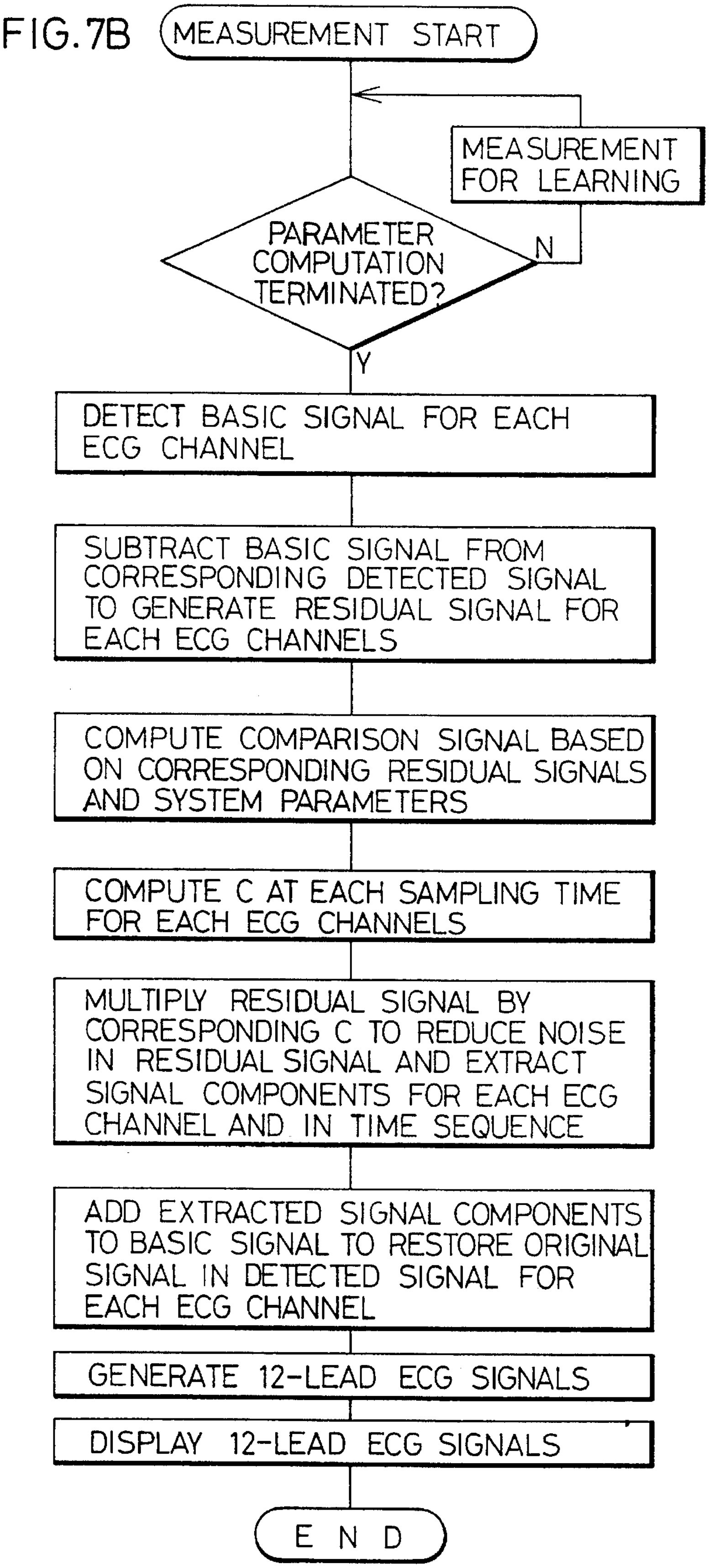
FIG. 7B is a second flowchart illustrating the operation in the computer when applying the invention.

The operation of an electrocardiograph constructed as described above is further explained with reference to flow char shown in FIG. 7.

The ECG signals, namely detected signal, of all eight channels are sampled and held by sampling-hold circuit 11 at a sampling rate 1 KHz, switched by the multiplexer 12, digitized by A/D converter 13 and input to the microcomputer 14.

In learning phase before actual processing, upon a learning signal from the control panel, the R wave is detected and base line wander is corrected for each channel. By selecting seven or more sample in the QRS wave of all channels, system parameters $\alpha_{ij}$ are calculated and stored in the computer.

Upon start signal from the panel, the detected signal of each channel is moving-averaged with, for example, 16 samples before and 16 samples after the undergoing sample time to generate basic signal V which is sufficiently smoothed and free from noise. Next, the residual signal Vr is generated for each channel by subtracting basic signal from the detected signal $V_{in}$. Then the comparison signal for each channels is generated by summing Vr of all remainder channels weighted by corresponding $\alpha_{ij}$. Then noise index is calculated in time sequence for each channels. By multiplying Vr with noise index c, the noise in Vr is reduced and the signal components contained in Vr is extracted. The extracted signal is added to the basic signal of corresponding channel to restored the original signal. With processed eight channel signal, the standard 12-lead ECG is generated with well-known method. The ECG signal is D/A converted and displayed on display device 15, or printed in recorder 16.

Figure 8:
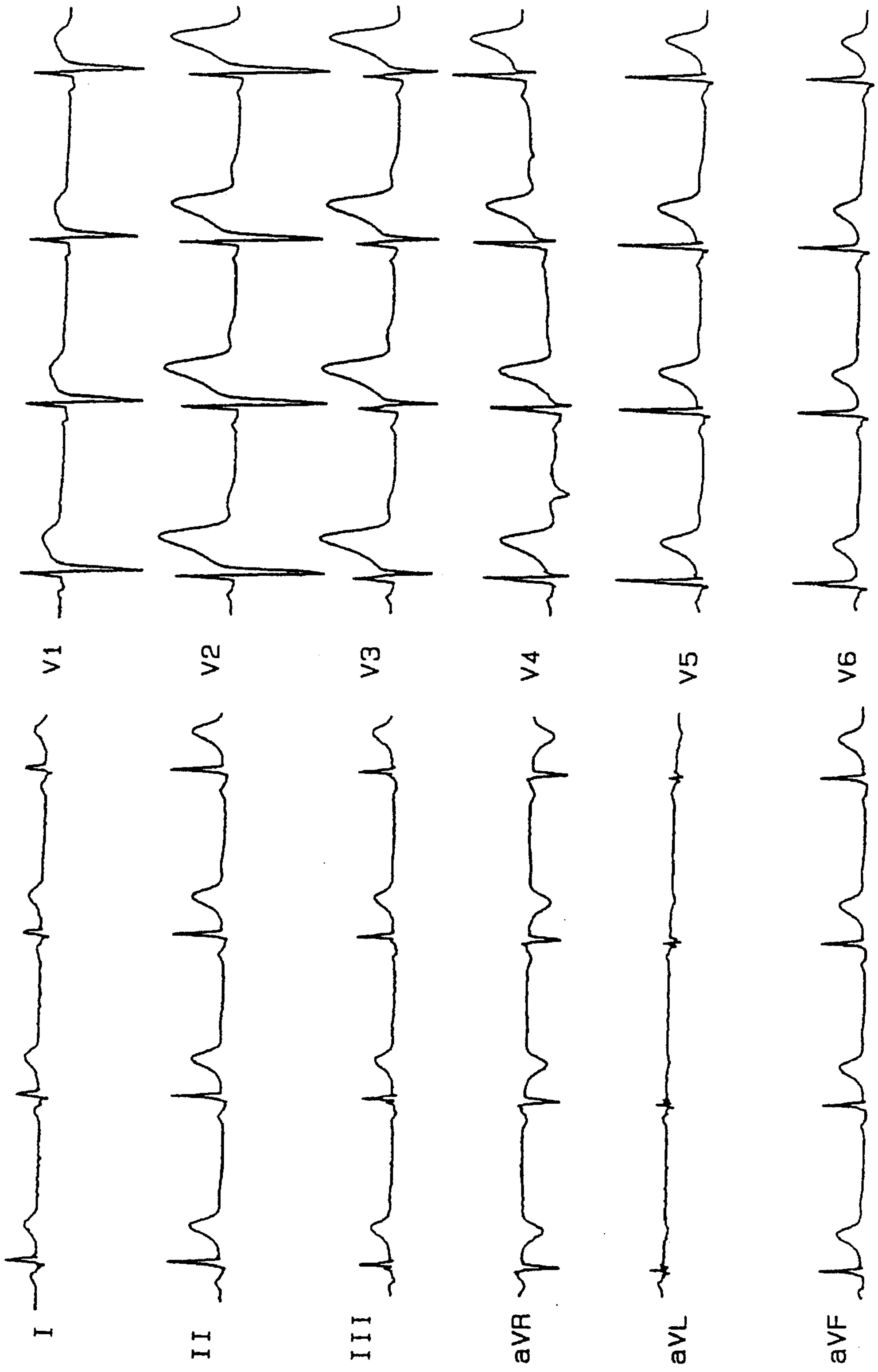
FIG. 8 is a diagram showing resultant ECG waveforms corresponding to FIG. 9 by applying the invention.
Figure 9:
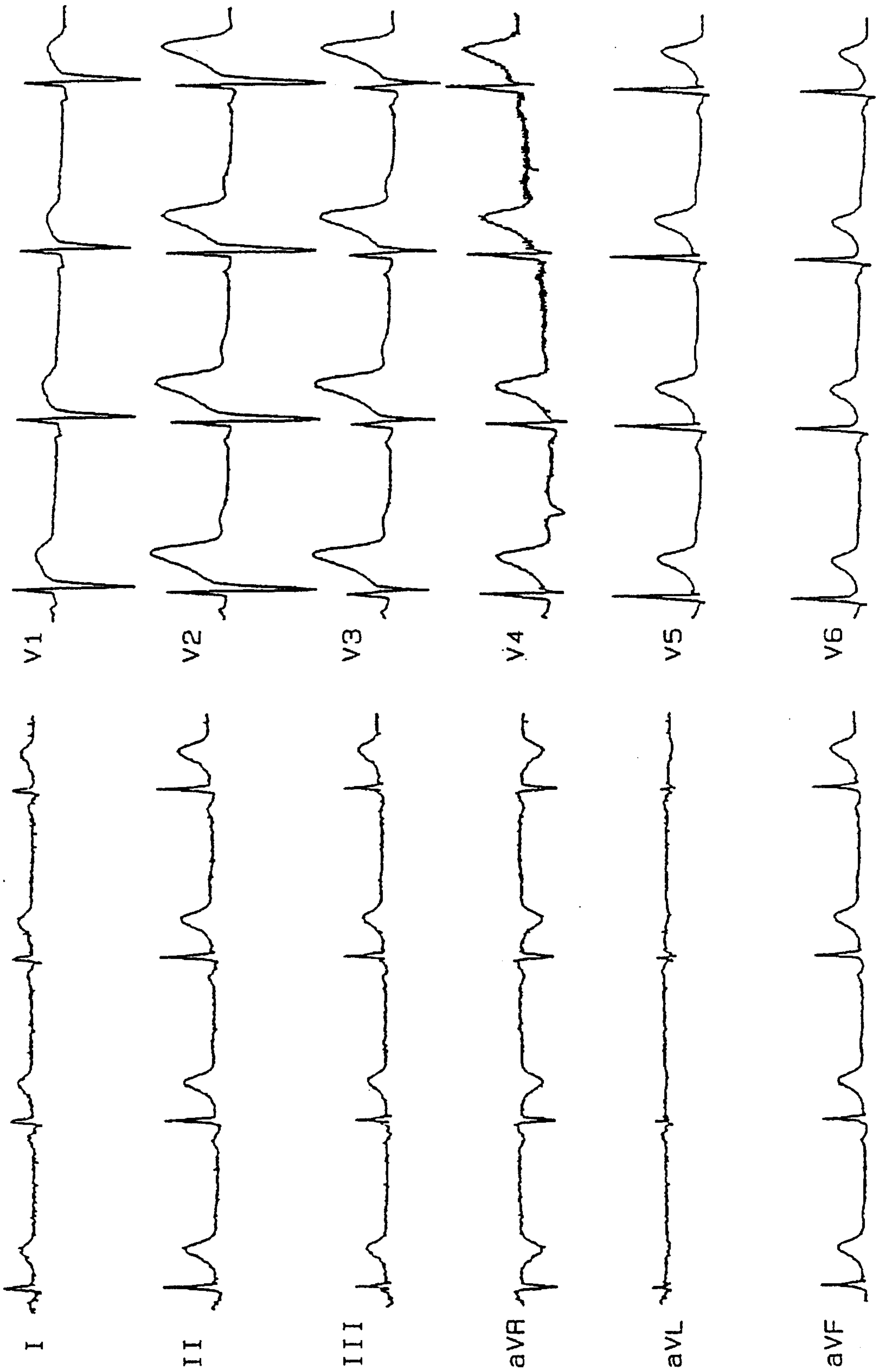
FIG. 9 is a diagram showing detected ECG waveforms with the electrocardiograph for testing the effect of the invention.
Figure 10:
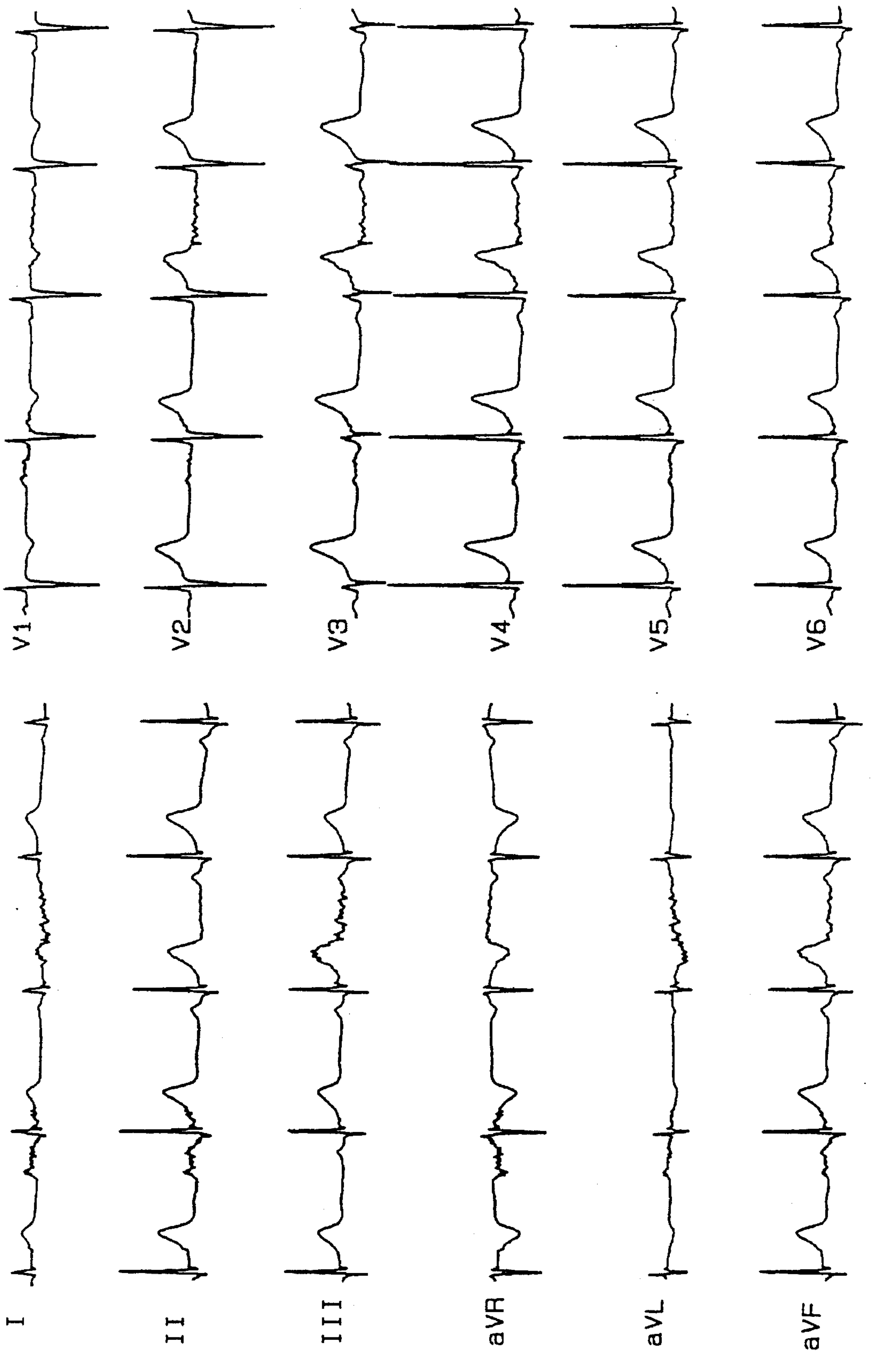
FIG. 10 is a diagram showing resultant ECG waveforms corresponding to FIG. 11 by applying the invention.
Figure 11:
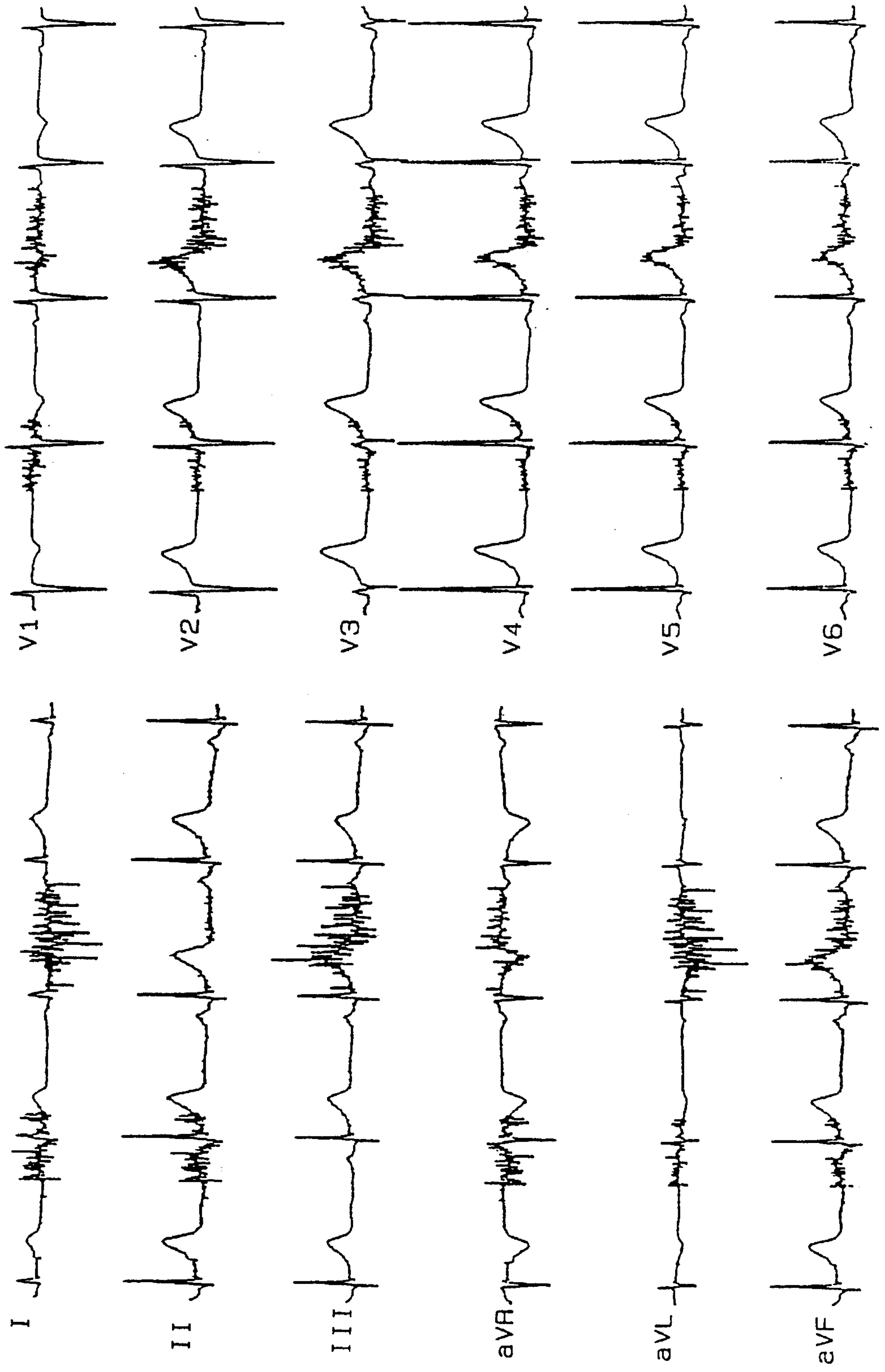
FIG. 11 is a diagram showing detected ECG waveforms with the electrocardiograph for testing the effect of the invention.
Figure 12:
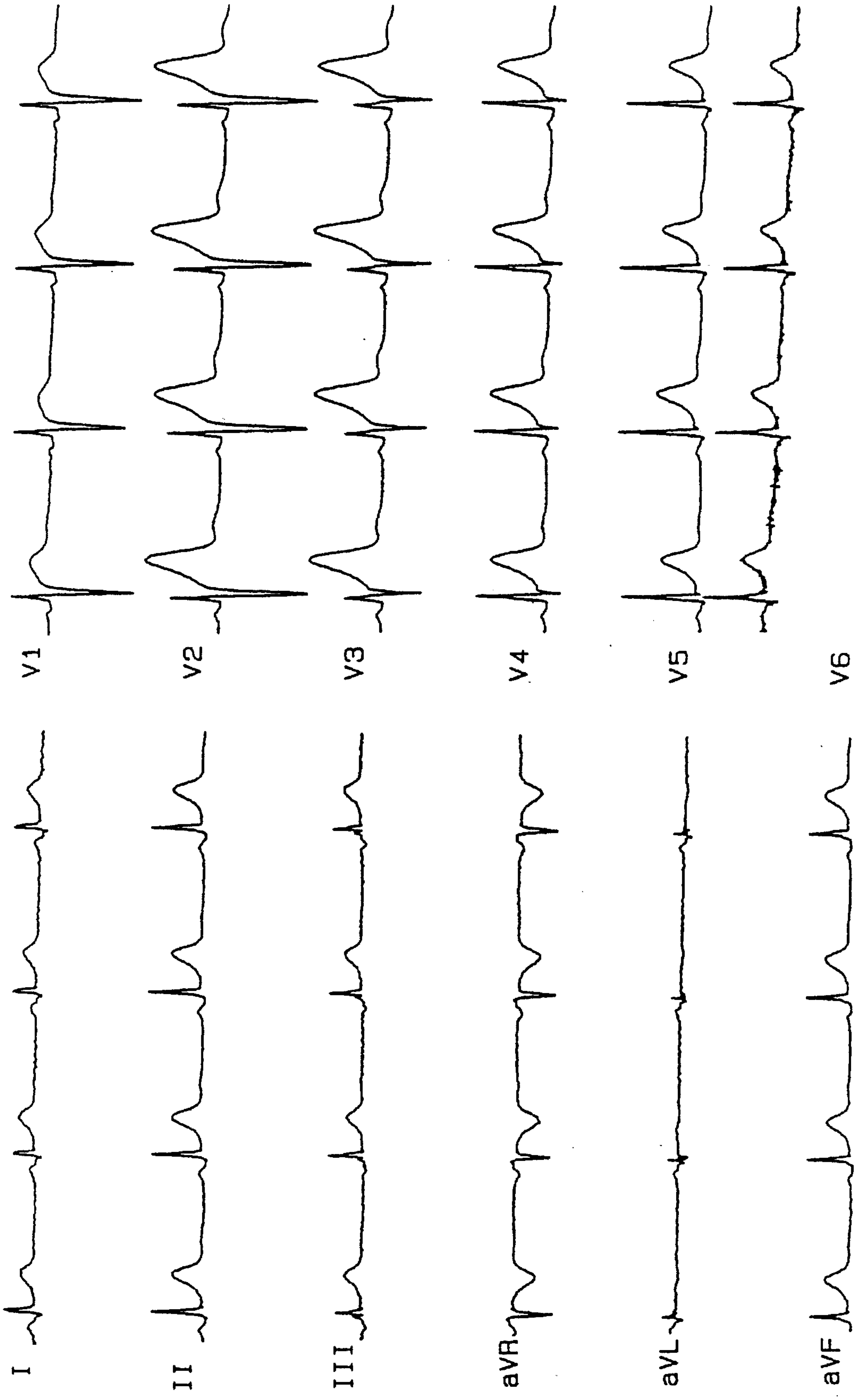
FIG. 12 is a diagram showing resultant ECG waveforms corresponding to FIG. 13 by applying the invention.
Figure 13:
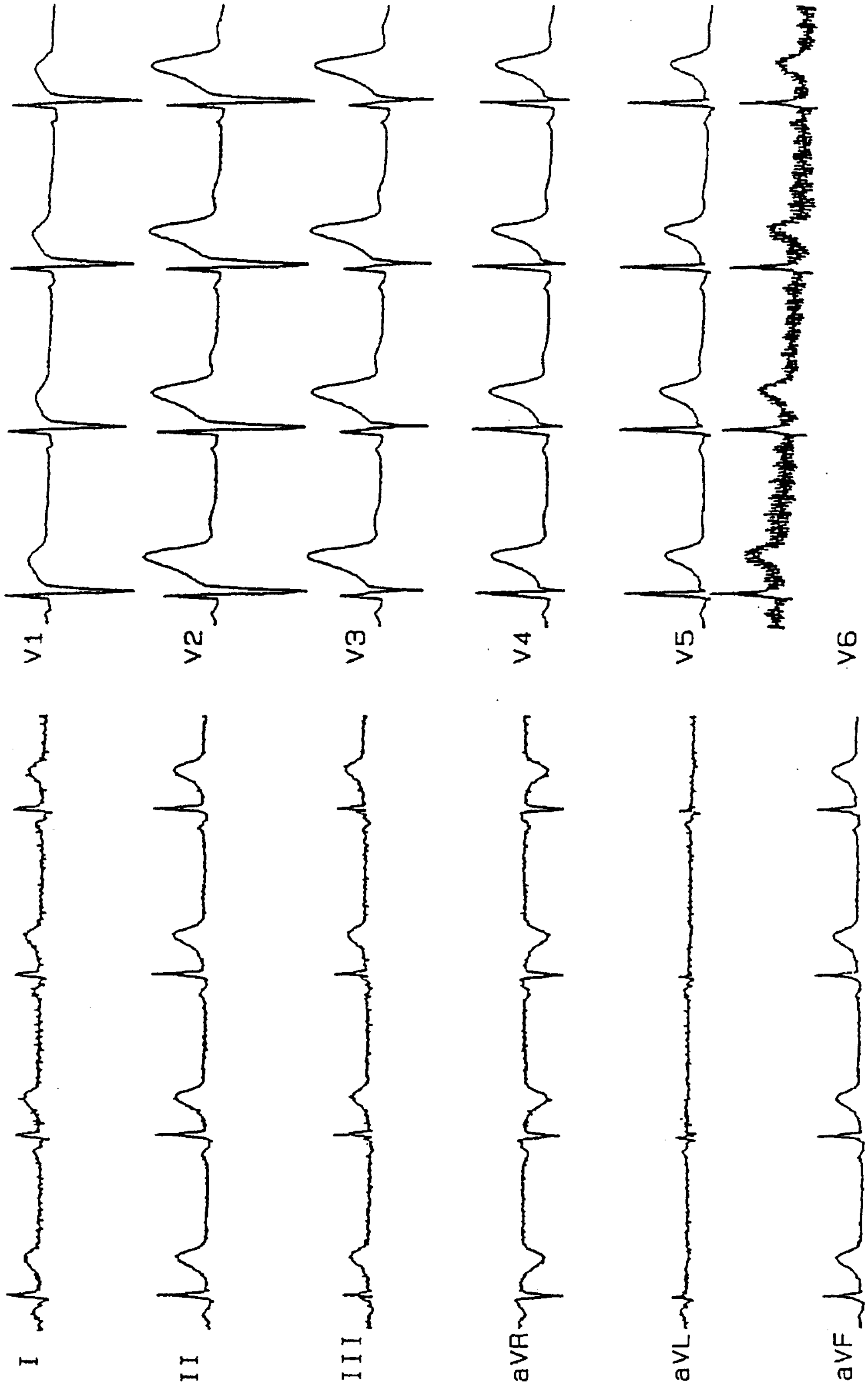
FIG. 13 is a diagram showing detected ECG waveforms with the electrocardiograph for testing the effect of the invention.

FIGS. 8 through 13 show waveforms detected and processed with the electrocardiograph for testing noise reduction effect of the invention. FIG. 9 show a case where noise arises from muscle tremors. FIG. 8 shows the filtered waveforms of FIG. 9 by applying the present invention. FIG. 11 shows a case where the detected signals are so seriously noised by muscle tremors that the ECG signal is buried within the noise. FIG. 10 shows waveforms of FIG. 11 by applying the present invention, shows FIG. 13 shows a case where noise arises from power interference (50 Hz) due to defective contacting of some electrodes. FIG. 12 shows the filtered waveforms of FIG. 13 by applying the present invention.

Figure 14:
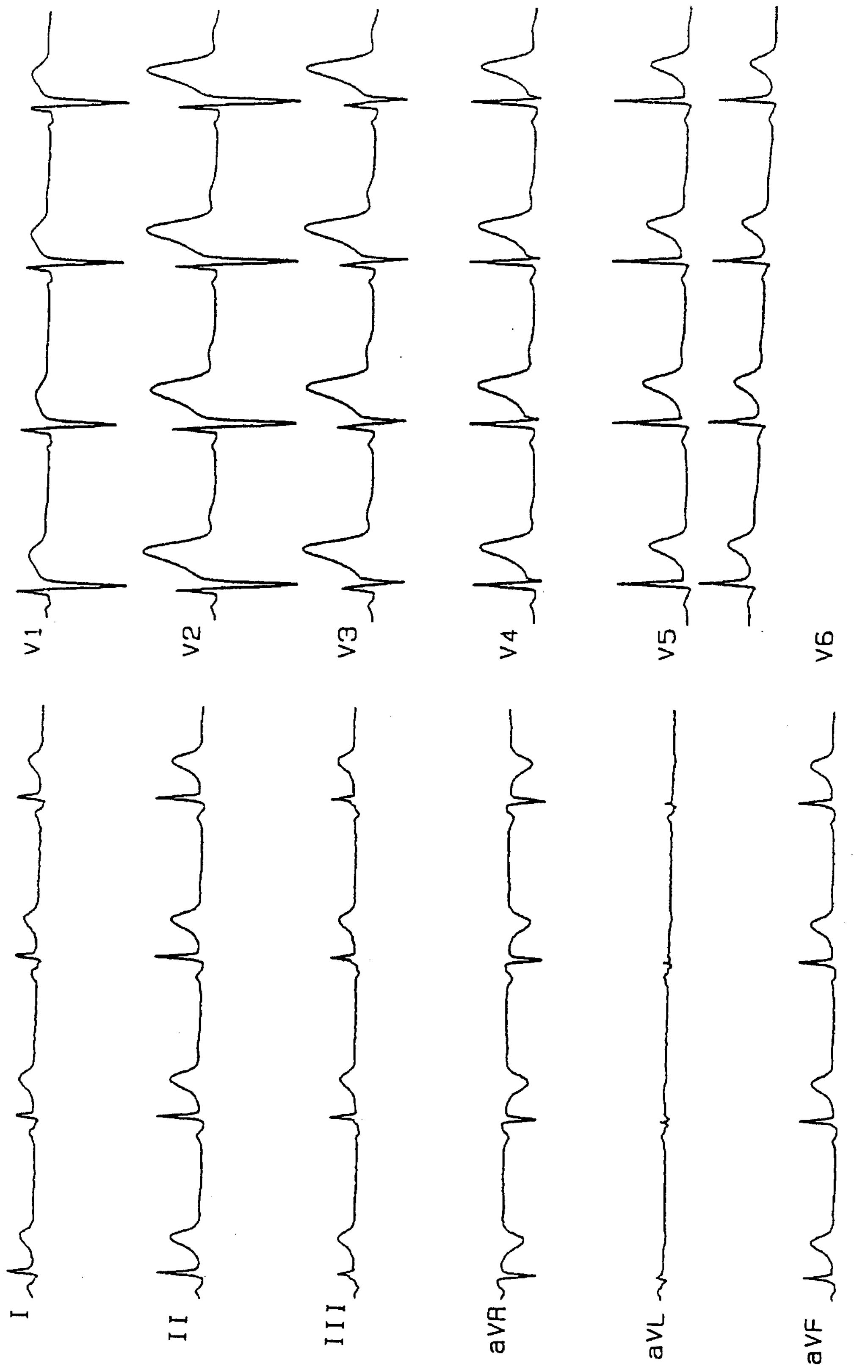
FIG. 14 is a diagram showing resultant ECG waveforms corresponding to FIG. 13 by applying the invention.

FIG. 14 shows the restored ECG signal from signals of FIG. 13 by using f(c), instead of c, to remove noise in residual signal. As compared to FIG. 12, the improvement in noise reduction is confirmed.

Figure 15:
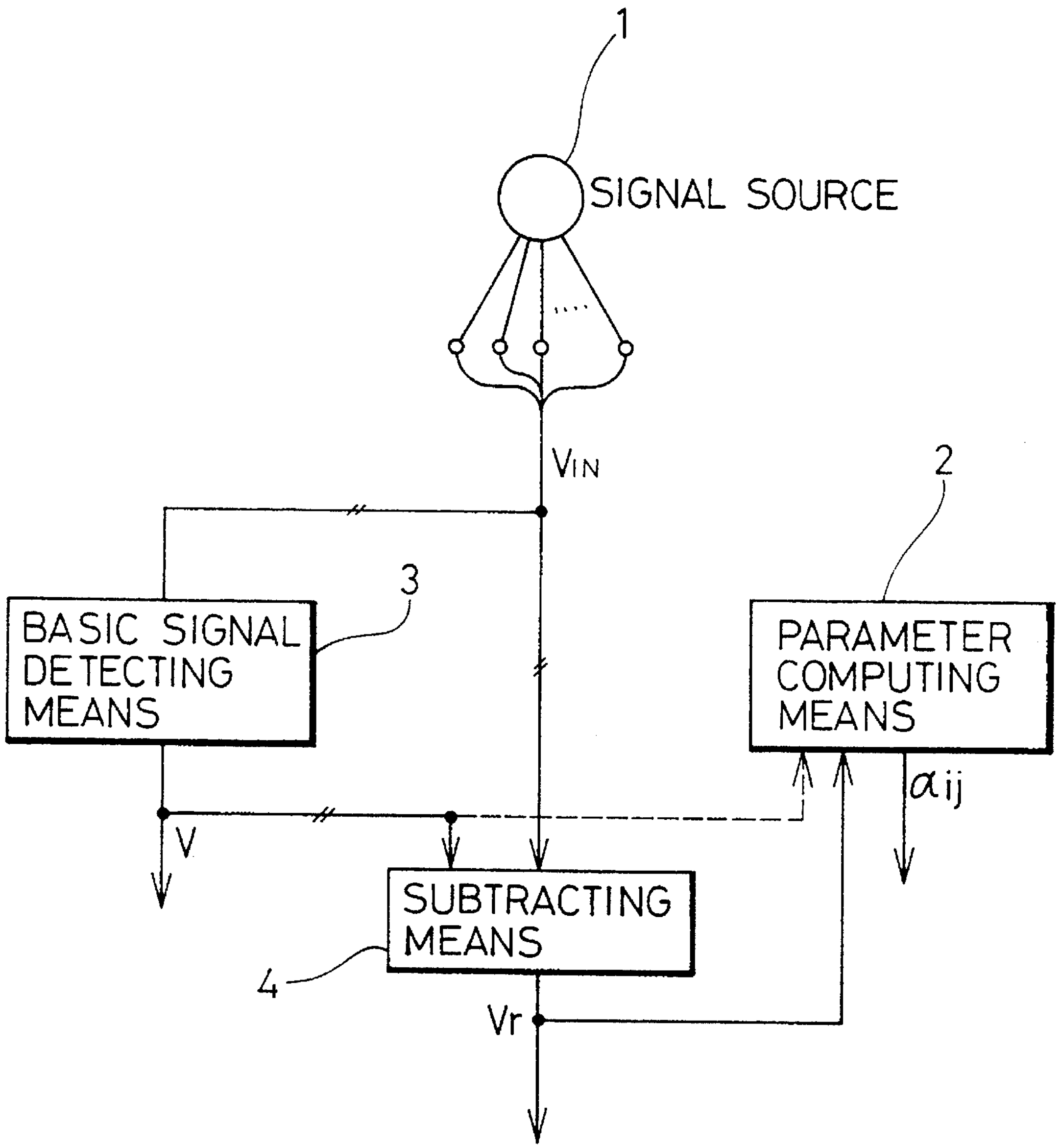
FIG. 15 is an illustration of an alternate embodiment of the electrocardiograph showed in FIG. 1.

Now some further explanation will be made associated with parameter computing means illustrated in FIG. 1. In FIG. 1, system parameters $\alpha_{ij}$ are calculated from detected signal $V_{in}$. However, instead of with the detected signal itself, system parameters can also calculated from signals derived from the detected signal. One way is to calculated $\alpha_{ij}$ with residual signal Vr, which reflects magnitude relationship of Vr among all channels. These parameters are calculated in learning phase and stored for later use as indicated by solid line in FIG. 15. Another way, as indicated by dotted line, is to use basic signal for calculating system parameters. Both of these ways are proved by practice to be effective.

In addition to biomedical systems described above, the present invention can be applied to various systems if the systems can be approximated by a linear or non-linear model and measured at a plurality of measurement points.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the claims. The following claims are to be accorded the broadest interpretation, so as to encompass all such modifications and equivalent structures and functions.

What is claimed is:

1. A noise reduction method for reducing noise which overlaps detected signals and is generated from sources different from a signal source during detection of distributed signals generated from the signal source at a plurality of measurement points comprising the steps of:

computing system parameters for a plurality of detected signals, the system parameters corresponding to a plurality of coefficients wherein a detected signal measured at an arbitrary measurement point can be expressed as a linear combination of the system parameters and all other detected signals using the least squares method with M samples of signals where M+1 is equal to or larger than the number of said plurality of measurement points;

detecting a basic signal, the basic signal being contained in the detected signal;

subtracting said basic signal from the detected signal to obtain a residual signal which comprises signal components of an original signal and overlapping noise;

generating a comparison signal corresponding to said residual signal detected from said arbitrary measurement point by weighting said residual signals of said all other measurement points with the computed system parameter and summing all the weighted residual signals;

computing a noise index which reflects the level of noise contained in the detected signal by calculating the coherence of said residual signal and said comparison signal of the corresponding measurement point;

removing said overlapping noise contained in said residual signal to obtain said signal components in said residual signal by multiplying said residual signal with said noise index; and restoring the original signal as an output by adding said signal components contained in said residual signal to said basic signal.

2. The noise reduction method according to claim 1, wherein each of said signals derived from the all other detected signals are the detected signal themselves.

3. The noise reduction method according to claim 1, wherein each of said signals derived from the all other detected signals are a basic signal.

4. The noise reduction method according to claim 1, wherein each of said signals derived from the all other detected signals is a residual signal wherein the residual signal is generated by subtracting said basic signal from the detected signal.

5. The noise reduction method according to claim 1, wherein said signal components are detected by multiplying said residual signal with a function, where said function is calculated so that said function takes a value of 1 when said noise index equals 1, wherein said function maintains a value close to 1 when said noise index takes relatively high values and wherein said function rapidly descends to lower values close to 0 when said noise index takes relatively small values.

6. The noise reduction method according to claim 1, wherein the detected signals for the overlapped noise to be rejected are digital signals sampled at successive sampling time and wherein said noise index computing step successively calculates said noise index at each sampling time by computing an averaged coherence of said residual signal and said comparison signal of the corresponding said arbitrary measurement point over a short period before and after the corresponding sampling time.

7. The noise reduction method according to claim 1, wherein the detected signals for the overlapped noise to be rejected are digital signals sampled at successive sampling time and said noise index computing step successively calculates a common noise index for all of said plurality of measurement points at each sampling time by computing an averaged coherence of said residual signal and said comparison signal of all said plurality of measurement points at the sampling time.

8. A noise reduction method for reducing noise which overlaps detected signals in a high frequency band and is generated from sources different from a signal source during detection of distributed signals generated from the signal source at a plurality of measurement points comprising the steps of:

computing system parameters for a plurality of detected signals, the system parameters corresponding to a plurality of coefficients wherein a detected signal measured at an arbitrary measurement point can be expressed as a linear combination of the system parameters and all other detected signals using the least squares method, with M samples of signals derived from the detected signals, where M+1 is equal to or larger than the number of said plurality of measurement points;

extracting low frequency components from the detected signal with a zero-phase low-pass filter to obtain a basic signal which is free from noise;

subtracting said basic signal from the detected signal to obtain a residual signal which comprises signal components of an original signal and overlapping noise;

generating a comparison signal corresponding to said residual signal detected from said arbitrary measurement point by weighting said residual signals of said all other measurement points with the computed system parameters and summing all the weighted residual signals, computing a noise index which reflects the level of noise contained in said detected signal by calculating the coherence of said residual signal and said comparison signal of the corresponding measurement point;

removing said overlapping noise contained in said residual signal to obtain said signal components in said residual signal by multiplying said residual signal by multiplying said residual signal with said noise index; and restoring the original signal as an output by adding said signal components contained in said residual signal to said basic signal.

9. A noise reduction apparatus for reducing noise which overlaps detected signals and is generated from sources different from a signal source during detection of distributed signals generated from the signal source at a plurality of measurement points comprising:

basic signal detecting means for detecting a basic signal which is free from noise;

subtracting means for subtracting said basic signal from said detected signal to obtain a residual signal which comprises signal components of an original signal and overlapping noise;

parameter computing means for computing system parameters for a plurality of detected signals, the system parameters corresponding to a plurality of coefficients wherein a detected signal measured at said arbitrary measurement point can be expressed as a linear combination of the system parameters and all other detected signals using the least squares method with M samples of signals where M+1 is equal to or larger than the number of said plurality of measurement points;

comparison signal generating means for generating a comparison signal corresponding to said residual signal detected from said arbitrary measurement point by weighting said residual signals of said all other measurement points with the computed system parameters, and summing all the weighted residual signals, noise index computing means for computing a noise index which reflects the level of noise contained in the detected signal by calculating the coherence of said residual signal and said comparison signal of the corresponding measurement point;

noise removing means for removing said overlapping noise contained in said residual signal to obtain said signal components in said residual signal by multiplying said residual signal with said noise index;

and adding means for restoring the original signal as an output by adding said signal components contained in said residual signal to said basic signal.

10. The apparatus according to claim 9, wherein basic signal detecting means is a low-pass filter which passes the low frequency components of the detected signal at a cut-off frequency so that the output of said low-pass filter is from the overlapping noise contained in said detected signal.

11. The apparatus according to claim 9, wherein the common signal source is the heart of a human or animal and the distributed signals generated from the signal source and measured at said plurality of measurement points are electrocardiographic potentials.

12. A noise reduction apparatus for reducing noise which overlaps detected signals in a high frequency band and is generated from sources different from a signal source during detection of distributed signals generated from the signal source at a plurality of measurement points comprising:

basic signal detecting means for detecting low frequency components to obtain a basic signal which is free from noise;

subtracting means for subtracting said basic signal from said detected signal to obtain a residual signal which comprises signal components of an original signal and the overlapping noise;

parameter computing means for computing system parameters for a plurality of detected signals, the system parameters corresponding to a plurality of coefficients wherein a detected signal measured at said arbitrary, measurement point can be expressed as a linear combination of the system parameters and all other detected signals using the least squares method with M samples of signals where M+1 is equal to or larger than the number of said plurality of measurement points;

comparison signal generating means for generating a comparison signal corresponding to said residual signal detected from said arbitrary measurement point by weighting said residual signals of said all other measurement points with computed system parameters, and summing all the weighted residual signals, noise index computing means for computing a noise index which reflects the level of noise contained in the detected signal by calculating the coherence of said residual signal and said comparison signal for the corresponding measurement point;

noise removing means for removing said overlapping noise contained in said residual signal to obtain said signal components in said residual signal by multiplying said residual signal with said noise index; and adding means for restoring the original signal as an output by adding said signal components contained in said residual signal to said basic signal.

* * * * *